Patented Jan. 17, 1950

2,495,108

UNITED STATES PATENT OFFICE 2,495,108

ARYL PHOSPHATES OF POLYVINYL ALCOHOL

Gennady M. Kosolapoff, Dayton, Ohio, assignor to Monsanto Chemical Company, St. Louis, Mo., a corporation of Delaware No Drawing. Application March 18, 1948, Serial No. 15,733

11 Claims. (Cl. 260—80)

The present invention relates to phosphorus-containing vinyl resins and more particularly to aryl-substituted phosphates of polyvinyl alcohol or derivatives thereof containing free hydroxyl groups. This invention also provides a process for producing the products.

I have found that by causing compounds of the general formula:

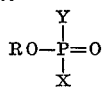

wherein R stands for an aromatic hydrocarbon radical, X stands for halogen and Y stands for a member of the group consisting of RO or halogen, to react upon polyvinyl alcohols or derivatives thereof containing free hydroxyl groups, there are obtained new, valuable phosphated resins which, according to the number and nature of hydroxyl groups available for phosphation and the number and nature of phosphate groups which have entered the molecule, possess different properties in respect to solubility, hardness, plasticity, flame-resistance. As examples of compounds having the above general formula, I may mention phenylphosphoryl dichloride, diphenylphosphoryl chloride, the tolylphosphoryl dichlorides, the ditolylphosphoryl chlorides, the xylylphosphoryl dichlorides, the dixylylphosphoryl chlorides, the naphthylphosphoryl dichlorides, the dinaphthylphosphoryl chlorides, etc. The products obtained by the phosphation when employing a diarylphosphoryl halide contain at least one group of the following formula:

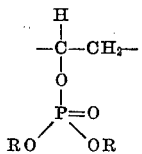

The products obtained by the phosphation when employing an arylphosphoryl dihalide contain at least one member of the group consisting of:

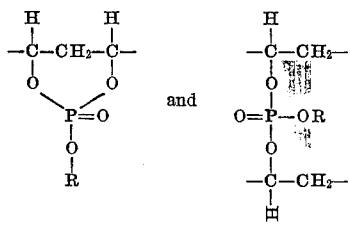

The group

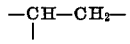

is the sole repeating unit in the chain.

Accordingly these compounds may be described as having the general structure:

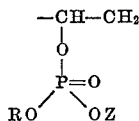

where R is an aromatic hydrocarbon radical and Z may be an aromatic hydrocarbon radical or the group:

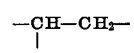

The new products may be produced by mixing an arylphosphoryl halide and polyvinyl alcohol or a derivative thereof containing free hydroxyl groups and heating the mixture at a moderate temperature.

The reaction which takes place causes a hydrogen halide to be liberated. Since the liberation of the hydrogen halide in the presence of polyvinyl alcohol may cause some undesirable discoloration or decomposition of the polyvinyl alcohol to take place, particularly at the higher concentrations of hydrogen halide, it is desirable, although not necessary, to have present in the reaction mass at the time of liberation of hydrogen halide a basic material which will combine with the hydrogen halide so as to eliminate or to diminish the concentration thereof.

As the basic material for this purpose, I may use any substance which will combine with or by its presence neutralize or decrease the hydrogen ion activity of the hydrogen halide. Suitable materials are any alkaline or alkaline earth hydroxides or carbonates or organic tertiary bases such as pyridine, picoline, quinoline, methyl quinoline, dimethyl aniline, diethyl aniline, dimethyl cyclohexylamine, diethyl cyclohexylamine, trialkylamines, N-alkyl morpholines, etc. These materials may be used separately or in combination. When pyridine is used it may also serve as a solvent for carrying out the reaction. When basic materials which are not solvents are to be employed, another solvent, diluents or dispersing agents such as ethylene dichloride, chloroform, carbon tetrachloride, benzene, toluene, etc. may be employed.

The polyvinyl arylphosphates obtained by reaction of polyvinyl alcohol with the arylphosphoryl halides differ remarkably from polyvinyl alcohol. They are water-insoluble; a film of the resin prepared by casting a solution of the same is completely resistant to water, i. e., water rolls off it and does not spread nor penetrate. Such a film is flexible, elastic and mechanically strong. When exposed to an open flame, the film does not support combustion; it merely shrinks and chars. Products of exceptionally good mechanical properties are obtainable by only partially phosphating the polyvinyl alcohol, and then reacting the partially phosphated material with an aldehyde such as butyraldehyde for the production of polyvinyl arylphosphate butyrals. Any aliphatic aldehyde having from one to four carbon atoms, and including formaldehyde, acetaldehyde, propionaldehyde or butyraldehyde may be used. Polyvinyl arylphosphate acetals are also obtainable by reaction of a partial acetal of polyvinyl alcohol with an arylphosphoryl halide.

The invention is illustrated, but not limited, by the following examples:

Example 1

Polyvinyl alcohol was prepared by hydrolysis of the polyvinyl acetate known to the trade as Gelva.

Twenty two grams of the polyvinyl alcohol was suspended, with vigorous stirring, in 600 cc. of redistilled pyridine, employing a flask provided with a mercury sealed stirrer, reflux condenser equipped with a calcium chloride drying tube, and a dropping funnel. The flask was placed in a thermostat maintained at a temperature of 50° C., and 150 grams of diphenylphosphoryl chloride was added to the polyvinyl alcohol—pyridine mixture during a period of 30 minutes. The reaction mixture was then stirred mechanically at a temperature of 50° C. for 26 hours. At the end of this time the product was pressure filtered at 50–60 pounds of pressure. The clear, yellowish filtrate obtained in this manner was allowed to stand overnight in a stoppered flask and was subsequently precipitated very slowly by dropwise addition to vigorously stirred water with small additions of sodium hydroxide to preserve alkalinity. The product was then thoroughly macerated in dilute sodium hydroxide and several changes of water, and it was then allowed to dry. At this stage it was an exceedingly elastic, rubbery, white solid. For further purification, it was dissolved in benzene and slowly precipitated by adding the benzene solution to hexane. Drying of the precipitated mass was effected in vacuum at a pressure of 2 mm.

Analysis of the product shows a phosphorus content of 10.98%, as against a 11.22% theoretical phosphorus content of polyvinyl diphenylphosphate; hence 98% esterification of the polyvinyl alcohol has been attained.

The polyvinyl diphenylphosphate obtained in the present example is rubbery and elastic. It possesses a considerable degree of adhesion to solids, is insoluble in water, and is non-inflammable when exposed to an open flame.

Example 2

Subsequent acetalation of the polyvinyl diphenylphosphate prepared in Example 1 was effected in the following manner:

Twenty grams of the ester was dissolved in 300 cc. of ethylene dichloride, treated with 35 cc. of butyraldehyde and 50 grams of freshly ignited sodium sulfate. The flask was then securely stoppered and placed on a shaking wheel for overnight. At the end of this time the reaction mixture was filtered, and the clear filtrate was slowly precipitated by hexane. The resin which separated out was washed in hexane and vacuum dried. The acetalation had resulted in the introduction of a plurality of acetal groups and considerable stiffening of the polyvinyl diphenyl phosphate without adversely affecting the other desirable properties thereof.

Example 3

This example describes the reaction of polyvinyl alcohol with phenylphosphoryl dichloride.

Twenty two grams of polyvinyl alcohol was suspended in 200 cc. of dry pyridine with vigorous stirring. The resulting suspension was heated to a temperature of from 45° C. to 48° C., and to it was added, dropwise, 53 grams of phenylphosphoryl dichloride. No visible change was observed during a period of approximately 1½ hours; then reaction occurred suddenly and violently. The suspension rapidly gelled and solidified, absorbing all solvent. Accordingly, the reaction mass was cooled, removed from the reaction vessel, and placed into a large volume of water. After thoroughly kneading the mass in the water, dilute sodium hydroxide being added in order to maintain the water slightly alkaline, the reaction product was obtained as a white, pliable mass which differed essentially from the initial polyvinyl alcohol. Besides being entirely insoluble in water, it was non-inflammable.

Example 4

This example describes the reaction of phenylphosphoryl dichloride with a polyvinylbutyral, known to the trade as Butvar, and containing 80% of butyral groups and 20% of hydroxyl groups.

Twenty five grams of vacuum-dried Butvar was suspended in 710 cc. of ethylene chloride, employing a 3-necked, round-bottom flask equipped with thermometer, dropping funnel, mercury sealed stirrer and a reflux condenser to which was attached a calcium chloride drying tube. To the Butvar-ethylene dichloride mixture there was then added 25 cc. of dried pyridine and then 11.4 grams of phenylphosphoryl dichloride was added through the dropping funnel during a period of from 5 to 6 minutes. Several minutes after the addition was completed, the suspension began to clear up rapidly. In a few minutes it was completely clear and quite fluid, and the temperature of the mixture had risen to about 29° C. After stirring for 75 minutes, no further change in the thin syrupy liquid was observable. Heat was applied by means of an electric hot plate. As the temperature rose over 35° C., the viscosity of the solution increased abruptly and continued to increase as the temperature was raised to 58° C., at which stage the contents of the flask was a colorless gel. This gel was removed from the flask and placed into a beaker of hexane, stirred and subdivided as minutely as possible. It was then placed into the colloid mill, hexane was added to it, and the whole was milled for a time of about 6 minutes. The product thus formed a coarse, yellowish-green powder. Color was removed from the powder by washing it with water and then vacuum-drying it at a temperature of 45° C. There was thus obtained a white, tough resin which had a phosphorus content of 5.23% as against a 5.17% theoretical phosphorus content of a polyvinyl alcohol having 80% of its hydroxyl groups converted to butyral groups and 20% of its hydroxyl groups converted to phenylphosphate groups.

The white resin obtained in this example was completely insoluble in water, was non-inflammable and showed mechanical properties comparable to those of Butvar. Its advantage over Butvar lies in its substantially no water absorption and its flame-resistance.

*Example 5*

This example describes the reaction of the Butvar of Example 4 with diphenylphosphoryl chloride.

Twenty grams of vacuum-dried Butvar was dissolved in 600 cc. of ethylene dichloride and then treated, with stirring, with 25 cc. of pyridine and 30 grams of diphenylphosphoryl chloride at 52° C. for 2½ hours. The product was then slowly precipitated by hexane and allowed to stand in fresh hexane overnight. Subsequently it was thoroughly washed with dilute sodium hydroxide and then put through the colloid mill for about six minutes, at the end of which time it was washed with water and dried.

There were thus obtained clear, substantially colorless granules of phosphated Butvar having a softening point of 100° C. and a melting point of 160° C. The product is soluble in chloroform, acetone and dioxane, partly soluble in benzene, ethyl alcohol and ethyl acetate and insoluble in hexane and water. It is non-inflammable.

The term "polyvinyl alcohol" is used herein to describe the product which is phosphated. Polyvinyl alcohol is the product of the hydrolysis of a polyvinyl ester such as polyvinyl acetate. For the present purpose, it is possible to start with the product of the complete hydrolysis of such polyvinyl acetate or it is also possible to start with the product of the incomplete hydrolysis of such ester. Products obtained by the incomplete hydrolysis may contain of the total as much as 30% of the residues of unhydrolyzed vinyl acetate. A commercially available product which is preferred for the present purpose contains from 0.5% to 6% of vinyl acetate groups, the balance being vinyl alcohol groups. Such product is a macromolecular polymer and may have a molecular weight of at least 1,000. However, other products may likewise be employed.

The above examples describe the general reaction of polyvinyl alcohol or partially acetalated polyvinyl alcohol with arylphosphoryl halides. The present invention is also applicable to the preparation of arylphosphates of other derivatives of polyvinyl alcohol containing free hydroxyl groups, for example, partially etherified or partially esterified polyvinyl alcohols, the introduction of the arylphosphate radicals into the same conferring increased water-resistance and substantial non-inflammability. The production of such phosphorus-containing resins may be effected by either partial phosphation of polyvinyl alcohol and subsequent etherification or esterification of the remaining free hydroxyl groups, or by reaction of partially esterified or partially etherified polyvinyl alcohol with the arylphosphates.

This application is a continuation-in-part of application Serial No. 468,825, filed December 12, 1942, now abandoned.

What I claim is:

1. The reaction product of an aromatic phosphoryl halide and a macromolecular polyvinyl alcohol.
2. The aryl phosphate of polyvinyl alcohol.
3. The diaryl phosphate of polyvinyl alcohol.
4. The phenyl phosphate of polyvinyl alcohol.
5. The process which comprises mixing polyvinyl alcohol and an aryl phosphoryl halide and heating the mixture at a moderate temperature until esterification is effected.
6. The process which comprises mixing together polyvinyl alcohol and diphenyl phosphoryl chloride and heating the mixture at a moderate temperature until esterification is effected.
7. The process which comprises mixing polyvinyl alcohol, an aryl phosphoryl halide and a basic reagent, and heating the mixture at a moderate temperature until esterification is effected.
8. The process which comprises mixing polyvinyl alcohol, an aryl phosphoryl chloride and a basic reagent, and heating the mixture at a moderate temperature until esterification is effected.
9. The process which comprises mixing polyvinyl alcohol, diphenyl phosphoryl chloride and a basic reagent, and heating the mixture at a moderate temperature until esterification is effected.
10. The process which comprises mixing polyvinyl alcohol, diphenyl phosphoryl chloride and pyridine and heating the mixture at a moderate temperature until esterification is effected.
11. The process which comprises mixing polyvinyl alcohol, an aryl phosphoryl halide and pyridine and heating the mixture at a moderate temperature until esterification is effected.

GENNADY M. KOSOLAPOFF.

No references cited.